(12) United States Patent
Kim et al.

(10) Patent No.: US 12,528,048 B2
(45) Date of Patent: Jan. 20, 2026

(54) AIR PURIFIER AND METHOD OF PURIFYING AIR

(71) Applicant: Samsung Electronics Co., Ltd., Suwon-si (KR)

(72) Inventors: Dongwook Kim, Suwon-si (KR); Jinkyu Kang, Hwaseong-si (KR); Joonseon Jeong, Seoul (KR); Hyoungwoo Choi, Hwaseong-si (KR); Hyun Chul Lee, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 744 days.

(21) Appl. No.: 17/864,863

(22) Filed: Jul. 14, 2022

(65) Prior Publication Data

US 2023/0219035 A1   Jul. 13, 2023

(30) Foreign Application Priority Data

Jan. 11, 2022   (KR) .................... 10-2022-0004304

(51) Int. Cl.
*B01D 53/75*   (2006.01)
*B01D 53/86*   (2006.01)
*H05H 1/24*   (2006.01)

(52) U.S. Cl.
CPC ......... *B01D 53/75* (2013.01); *B01D 53/8675* (2013.01); *H05H 1/2406* (2013.01); *B01D 2251/104* (2013.01)

(58) Field of Classification Search
CPC ............. B01D 53/75; B01D 53/8675; B01D 2251/104; B01D 53/323; B01D 53/885; B01D 2259/806; B01D 2257/90; B01D 2255/802; B01D 2259/804; B01D 2257/09; B01D 2259/4508; B01D 2257/106; H05H 1/2406; H05H 2245/15; H05H 1/2418; H05H 1/2431; B01J 19/08; B01J 19/088; F24F 8/80; F24F 8/30; F24F 8/22; A61L 2/14; A61L 9/22; B03C 3/64; B03C 3/16; B03C 3/09; B03C 3/016; B03C 3/366; H01J 37/32

See application file for complete search history.

(56) References Cited

U.S. PATENT DOCUMENTS 6,238,525 B1 * 5/2001 Lox .................. B01D 53/32
                                                    204/179
8,702,850 B2   4/2014 Suzuki et al.
(Continued)

FOREIGN PATENT DOCUMENTS

CN   111010791 A    4/2020
KR   100530765 B1   11/2005
(Continued)

*Primary Examiner* — Xiuyu Tai
(74) *Attorney, Agent, or Firm* — CANTOR COLBURN LLP

(57) ABSTRACT

An air purifier includes a hollow reactor extending in one direction, a discharge plasma generator including a first electrode disposed on an outer wall of the reactor and a second electrode which is disposed inside the reactor and generates discharge plasma in a predetermined discharge region, a plurality of dielectric particles disposed in a packed-bed of the reactor, and a liquid supply unit which supplies fine droplets into the inside of the reactor.

15 Claims, 9 Drawing Sheets

(56) References Cited

U.S. PATENT DOCUMENTS

| | | | |
|---|---|---|---|
| 11,338,240 B2 | 5/2022 | Jeong et al. | |
| 2007/0029500 A1* | 2/2007 | Coulombe | H01T 23/00 |
| | | | 250/423 F |
| 2009/0324443 A1* | 12/2009 | Whitehead | B01D 53/32 |
| | | | 422/4 |
| 2012/0093691 A1* | 4/2012 | Mole | F24F 8/80 |
| | | | 422/310 |
| 2017/0028095 A1 | 2/2017 | Ohyama et al. | |
| 2021/0231324 A1 | 7/2021 | Park et al. | |
| 2022/0126234 A1 | 4/2022 | Jeong et al. | |
| 2022/0370937 A1 | 11/2022 | Choi et al. | |
| 2023/0151983 A1 | 5/2023 | Jeong et al. | |

FOREIGN PATENT DOCUMENTS

| | | |
|---|---|---|
| KR | 1020110006017 A | 1/2011 |
| KR | 101553587 B1 | 9/2015 |
| KR | 101933258 B1 | 3/2019 |
| KR | 1020200091167 A | 7/2020 |
| KR | 1020210059095 A | 5/2021 |
| KR | 1020210097030 A | 8/2021 |
| KR | 1020210128270 A | 10/2021 |
| KR | 1020220056021 A | 5/2022 |
| KR | 1020220158602 | 12/2022 |
| KR | 1020230070971 | 5/2023 |

\* cited by examiner

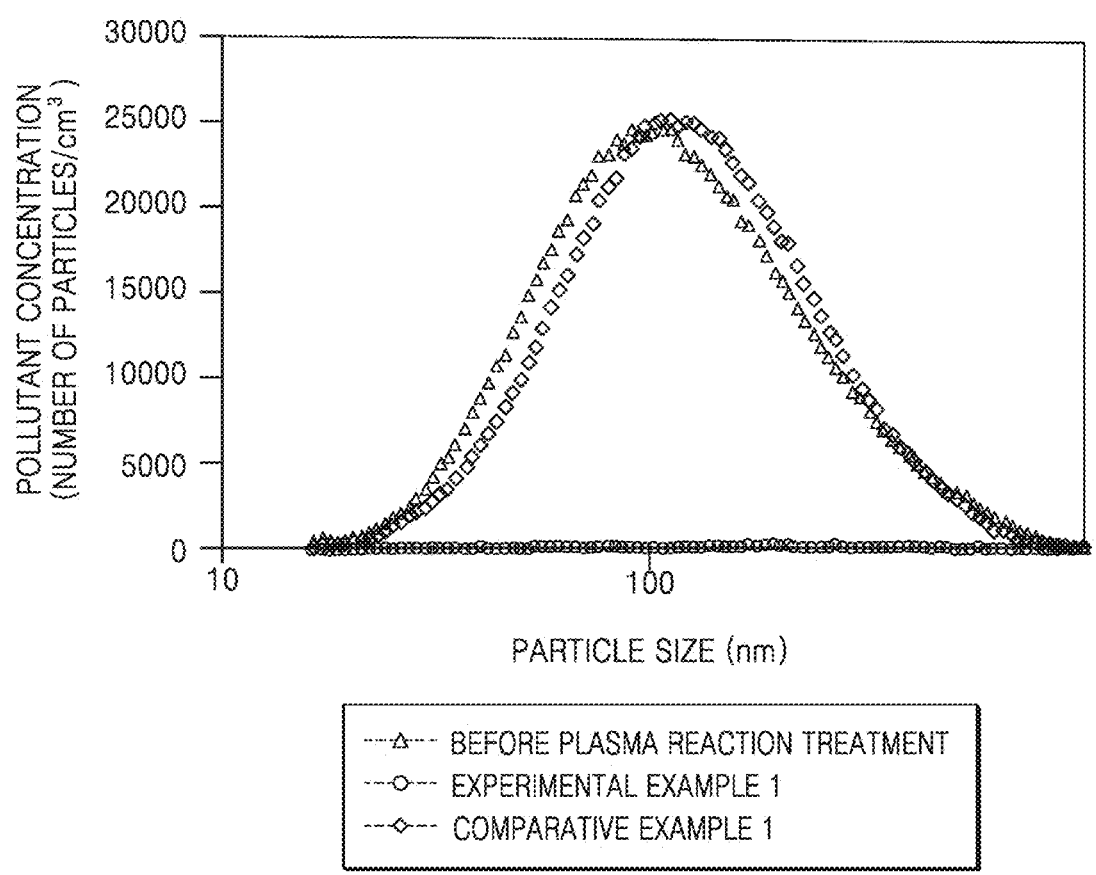

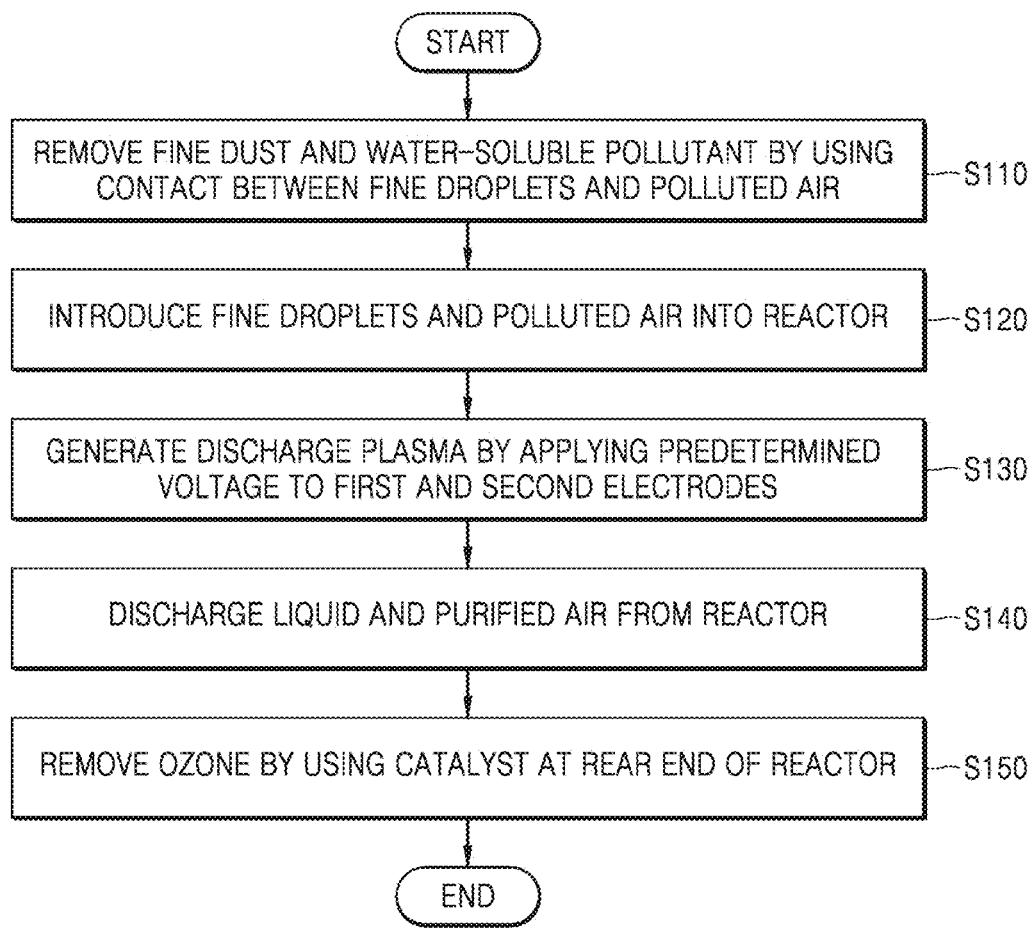

AIR PURIFIER AND METHOD OF PURIFYING AIR

This application claims priority to Korean Patent Application No. 10-2022-0004304, filed on Jan. 11, 2022, and all the benefits accruing therefrom under 35 U.S.C. § 119, the content of which in its entirety is herein incorporated by reference.

BACKGROUND

1. Field

Embodiments of the invention relate to air purifiers for purifying fine dust and pollutants in a gas and methods of purifying air.

2. Description of the Related Art

An air purifier purifies a gas, e.g., air, by collecting or decomposing fine dust and pollutants in the air. The air purifier may be applied to industrial dust collectors, air conditioning/ventilation systems in buildings, and the like.

In order to remove fine dust and pollutants in the air, a plasma removal method and a water-soluble pollutant removal method may be used. Water-soluble pollutants may be removed by bringing them into contact with an aqueous cleaning solution and discharging them to the outside. Insoluble pollutants may be removed by decomposing them by plasma and emitting them to the outside.

SUMMARY

Dielectric particles may be packed in a reactor that uses plasma to increase a reaction contact area. When an aqueous cleaning solution surrounds the dielectric particles, a surface charge on dielectric surfaces may be dissipated or reduced. Accordingly, there is a difficulty in maintaining the surface charge on the dielectric surface.

Provided are air purifiers capable of maintaining a surface charge of dielectric particles filled in a discharge plasma reactor and methods of purifying air.

Provided are air purifiers including a pollutant removal unit that does not need to be periodically replaced or maintained and methods of purifying air.

Provided are air purifiers with improved performance of removing fine dust and pollutants and methods of purifying air.

Additional features will be set forth in part in the description which follows and, in part, will be apparent from the description, or may be learned by practice of the presented embodiments of the invention.

In an embodiment of the invention, an air purifier includes a reactor having a hollow shape extending in a predetermined direction, a discharge plasma generator including a first electrode disposed on an outer wall of the reactor and a second electrode which is disposed inside the reactor and generates discharge plasma in a predetermined discharge region, a plurality of dielectric particles disposed in a packed-bed of the reactor, and a liquid supply unit which supplies fine droplets into the inside of the reactor, wherein the plurality of dielectric particles has a relative density of about 30 percent (%) or more and about 90% or less.

In an embodiment, the plurality of dielectric particles may include at least one of silicon oxide, boron oxide, aluminum oxide, manganese oxide, titanium oxide, barium oxide, copper oxide, magnesium oxide, zinc oxide, zirconium oxide, yttrium oxide, calcium oxide, nickel oxide, and iron oxide.

In an embodiment, the porosity of the packed-bed may be greater than about 10% and less than or equal to about 90 percent (%).

In an embodiment, the plurality of dielectric particles may have an average particle diameter of about 0.5 millimeter (mm) or more and about 20 mm or less.

In an embodiment, a ratio of the fine droplets with respect to a first purified air supplied to the reactor may be about 0.0001 or more and about 0.001 or less.

In an embodiment, a voltage of about 2 kilovolts (kV) or more and about 500 KV or less may be applied to the predetermined discharge region.

In an embodiment, the air purifier may further include a high voltage generator which applies a high voltage to the inside of the reactor.

In an embodiment, the first electrode may be provided with a silver paste film.

In an embodiment, the second electrode may extend in the predetermined direction and may be separated from the first electrode with a predetermined distance therebetween.

In an embodiment, the reactor may be provided with a glass conduit extending in the predetermined direction.

In an embodiment, the fine droplets may include water.

In an embodiment, the fine droplets may include a basic aqueous solution.

In an embodiment, the alkaline strength (PH) of the basic aqueous solution may be determined according to an ozone concentration inside the reactor.

In an embodiment, the fine droplets may be an aqueous sodium hydroxide solution having a molar concentration of about 2 millimoles per liter (mmol/L) or more and about 20 mmol/L or less.

In an embodiment, the air purifier may further include a catalyst unit disposed at a rear end of the reactor to remove ozone discharged from the reactor by a catalyst.

In an embodiment, the air purifier may further include a gas-liquid contact unit disposed at a front end of the reactor.

In an embodiment of the invention, a method of purifying air includes introducing fine droplets and polluted air into a reactor, generating a discharge plasma by applying a predetermined voltage to a first electrode and a second electrode, and discharging a liquid and purified air from the reactor.

In an embodiment, the plurality of dielectric particles may include at least one of silicon oxide, boron oxide, aluminum oxide, manganese oxide, titanium oxide, barium oxide, copper oxide, magnesium oxide, zinc oxide, zirconium oxide, yttrium oxide, calcium oxide, nickel oxide, and iron oxide.

In an embodiment, the method of purifying air may further include removing ozone by a catalyst at the rear end of the reactor.

In an embodiment, the method of purifying air may further include removing fine dust and water-soluble pollutants by contact between the fine droplets and the polluted air at the front end of the reactor.

BRIEF DESCRIPTION OF THE DRAWINGS

The above and other features and advantages of embodiments of the invention will be more apparent from the following description taken in conjunction with the accompanying drawings, in which:

FIG. 4 is a graph showing changes in a concentration of potassium chloride in Experimental Example 1 and Comparative Example 1 before a discharge plasma treatment;

FIG. 6 is a flowchart of an embodiment of a method of purifying air.

DETAILED DESCRIPTION

Figure 1:
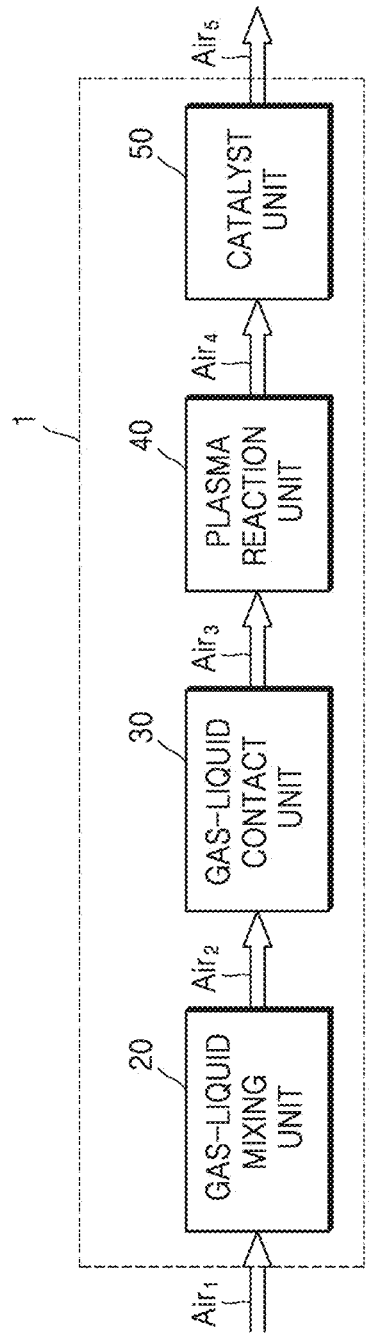
FIG. 1 is a block diagram of an embodiment of an air purifier.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the drawing figures, to explain features. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the invention will be described in detail with reference to the accompanying drawings. In the drawings below, like reference numerals refer to like components, and the size of each component in the drawings may be exaggerated for clarity and convenience of description.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Figure 2:
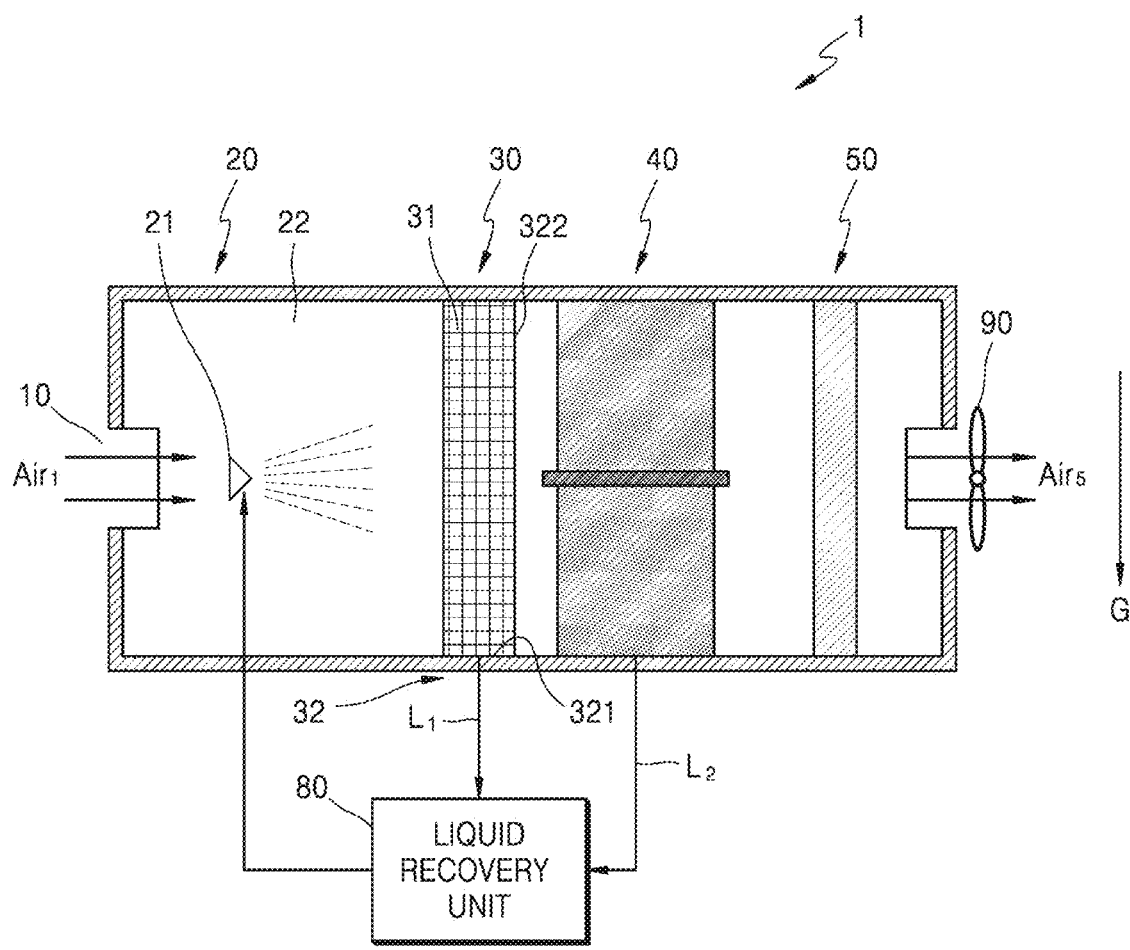
FIG. 2 is a schematic configuration of an air purifier.

FIG. 1 is a block diagram of an embodiment of an air purifier 1. FIG. 2 is a schematic configuration of an embodiment of the air purifier 1.

Referring to FIGS. 1 and 2, the air purifier 1 in an embodiment includes an air inlet 10 through which polluted air $Air_1$ is introduced, a gas-liquid mixing unit 20 which mixes the polluted air $Air_1$ with droplets by spraying the droplets, a gas-liquid contact unit 30 that is connected to the gas-liquid mixing unit 20 to be in a fluid communication therewith and separates gas-liquid mixed fluid $Air_2$ into first purified air $Air_3$ and a liquid $L_1$, a plasma reaction unit 40 that is connected to the gas-liquid contact unit 30 to be in a fluid communication therewith and purifies the first purified air $Air_3$ by discharge plasma, and a catalyst unit 50 that is connected to the plasma reaction unit 40 to be in a fluid communication therewith and remove ozone from second purified air $Air_4$.

In the illustrated embodiment, the gas-liquid mixing unit 20, the gas-liquid contact unit 30, the plasma reaction unit 40, and the catalyst unit 50 are sequentially disposed, but the invention is not limited thereto. In the air purifier 1 in another embodiment, the plasma reaction unit 40, the catalyst unit 50, the gas-liquid mixing unit 20, and the gas-liquid contact unit 30 may be sequentially disposed.

In the specification, the polluted air $Air_1$ may denote a mixed gas including air and one or more of fine dust PM (refer to FIG. 3D), water-soluble organic compounds $VOC_{sol}$, and water-insoluble organic compounds $VOC_{insol}$. In an embodiment, the fine dust PM may include small fine dust of about 10 micrometer (μm) or less and ultrafine dust of about 2.5 μm or less. In addition, the water-soluble organic compound $VOC_{sol}$ is a volatile organic compound, and may include gaseous substances that may be captured and removed in water or an aqueous solution, e.g., ammonia ($NH_3$), acetaldehyde ($CH_3CHO$), or acetic acid ($CH_3COOH$). In addition, the water-insoluble organic compound $VOC_{insol}$ is a volatile organic compound that is not collected in water or an aqueous solution, and may include, e.g., benzene ($C_6H_6$), formaldehyde ($CH_2O$), toluene ($C_6H_5CH_3$), or the like. However, the invention is not limited thereto, and any gas other than fine dust PM, a water-soluble organic compound $VOC_{sol}$, and a water-insoluble organic compound $VOC_{insol}$ may be included in polluted air $Air_1$.

The air inlet 10 is a passage through which the polluted air $Air_1$ is introduced. In an embodiment, a pump (not shown) may be disposed in the air inlet 10, and thus, negative pressure may be generated so that the polluted air $Air_1$ may be introduced into the air inlet 10.

In addition, as shown in FIG. 2, when the air inlet 10, the gas-liquid mixing unit 20, the gas-liquid contact unit 30, the plasma reaction unit 40, and the catalyst unit 50 are sequentially arranged so that they communicate with each other, a pressing member 90, e.g., a blower may be disposed at a rear end of the air purifier 1. Accordingly, the polluted air $Air_1$, the gas-liquid mixed fluid $Air_2$, the first purified air $Air_3$, the second purified air $Air_4$, and third purified air $Air_5$ may move in a direction different from a direction of gravity G along the air inlet 10, the gas-liquid mixing unit 20, the gas-liquid contact unit 30, the plasma reaction unit 40, and the catalyst unit 50.

The gas-liquid mixing unit 20 in an embodiment may be connected to the air inlet 10 to be in fluid communication therewith. Accordingly, the polluted air $Air_1$ passing through the air inlet 10 may be introduced into the gas-liquid mixing unit 20 to be mixed with the fine droplets. In an embodiment, the gas-liquid mixing unit 20 may include a liquid supply unit 21 which sprays fine droplets, and a fluid mixer 22 which mixes the fine droplets with the polluted air $Air_1$.

The liquid supply unit 21 may inject fine droplets, e.g., water, into the fluid mixer 22. In an embodiment, the liquid supply unit 21 may include one or more spray nozzles. In an embodiment, water stored in a liquid recovery unit 80 is pressurized by a pump (not shown) and injected into the fluid mixer 22 in the form of fine droplets through a spray nozzle, for example. In this process, some of the fine dust PM and water-soluble organic compounds $VOC_{sol}$ included in the polluted air $Air_1$ are collected in the fine droplets. Accordingly, gas-liquid mixed fluid $Air_2$, in which the polluted air $Air_1$ is mixed with fine droplets, may be formed in the fluid mixer 22.

The gas-liquid contact unit 30 in an embodiment is connected to the gas-liquid mixing unit 20 to be in fluid communication therewith, and may include an impactor 31 which collects droplets included in the gas-liquid mixed fluid $Air_2$ and a gas-liquid contact unit housing 32. In an embodiment, the impactor 31 may include a plurality of micro-channels. The gas-liquid mixed fluid $Air_2$ delivered from the gas-liquid mixing unit 20 may pass through the plurality of micro-channels. In an embodiment, the gas-liquid contact unit housing 32 may be an accommodating member accommodating the impactor 31.

The impactor 31 in an embodiment may include a porous member for collecting fine droplets included in the gas-liquid mixed fluid $Air_2$. In an embodiment, the porous member filled in the impactor 31 may be a filling member having a predetermined void. In an embodiment, the porous member may include one or more of a porous foam block, a fine filler, or a porous mesh screen, for example. In this case, the plurality of micro-channels defined in the impactor 31 may be defined by a spacing between the porous members.

The gas-liquid contact unit housing 32 in an embodiment may include a liquid outlet 321 through which the gas-liquid mixed fluid $Air_2$ is introduced, and a liquid $L_1$ is discharged in a direction of gravity G, and a gas discharge unit 322 through which the first purified air $Air_3$ not collected by the porous member in the gas-liquid mixed fluid $Air_2$ is discharged. In an embodiment, the liquid outlet 321 may be disposed in the direction of gravity G, e.g., on a lower surface of the gas-liquid contact unit housing 32 so that the liquid $L_1$ may be discharged according to the direction of gravity G. In this case, the gas discharge unit 322 may be disposed in a direction different from the direction of gravity G, e.g., on a side surface of the gas-liquid contact unit housing 32 so that the first purified air $Air_3$ may be discharged.

As described above, in an embodiment, the gas-liquid mixed fluid $Air_2$ delivered from the gas-liquid mixing unit 20 passes through the micro-channels defined in the impactor 31. In this process, fine droplets are collected on a surface of the porous member included in the impactor 31. The micro-droplets collected on the surface of the porous member are converted into the liquid $L_1$ by combining with each other. The converted liquid $L_1$ falls in the direction of gravity G due to gravity G. The liquid $L_1$ that has fallen in the direction of gravity G may be recovered by the liquid recovery unit 80. In this case, the first purified air $Air_3$ that is not collected by the porous member among the gas-liquid mixed fluid $Air_2$ may be discharged through the gas discharge unit 322. In addition, at this time, the first purified air $Air_3$ passing through the gas discharge unit 322 may include fine droplets that are not captured by the impactor 31 and remaining contaminants that are not captured in the liquid $L_1$ among the polluted air $Air_1$.

In an embodiment, the liquid $L_1$ collected by the liquid recovery unit 80 may include contaminants. In this case, an arbitrary purifier capable of purifying the contaminants collected in the liquid $L_1$ may be disposed in the liquid recovery unit 80. As described above, the liquid $L_1$ from which contaminants have been removed by the arbitrary purifier disposed in the liquid recovery unit 80 may be supplied to the liquid supply unit 21 by a pressure means, such as a pump (not shown), and may be reused.

As described above, the first purified air $Air_3$ passing through the gas discharge unit 322 may include fine droplets that are not collected by the impactor 31 and remaining contaminants that are not collected in the liquid $L_1$ in the polluted air $Air_1$. In an embodiment, the first purified air $Air_3$ flowing into the plasma reaction unit 40 may be a mixed fluid in which the fine droplets that are not collected by the impactor 31 is mixed with the remaining contaminants that are not collected in the liquid $L_1$ in the polluted air $Air_1$, for example.

In an embodiment, when excessive fine droplets are introduced into the plasma reaction unit 40, a water film may be formed on dielectric particles 430, as described later. When a water film is formed on the dielectric particles 430, a surface charge of the dielectric particles 430 may be dissipated or reduced. Accordingly, the liquid supply unit 21 may control an injection amount of the fine droplets so that the fine droplets included in the first purified air $Air_3$ that is introduced into the plasma reaction unit 40 minimize the water film on surfaces of the dielectric particles 430.

Figure 3A:
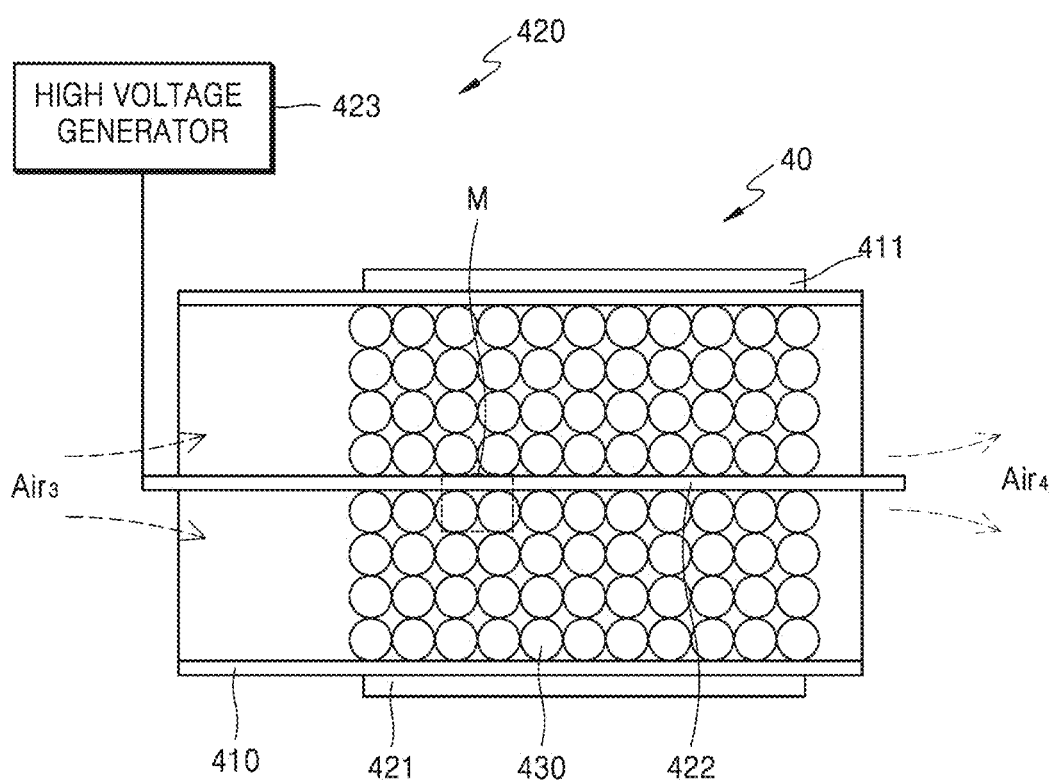
FIG. 3A is an enlarged cross-sectional view illustrating a part of a plasma reaction unit of FIG. 2.
Figure 3B:
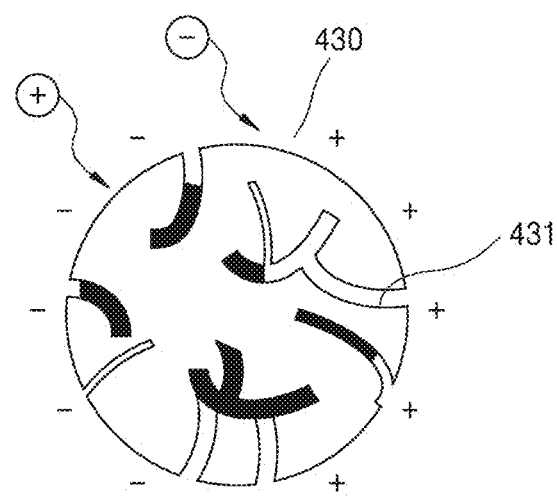
FIG. 3B is a schematic diagram of an embodiment of a dielectric particle.
Figure 3C:
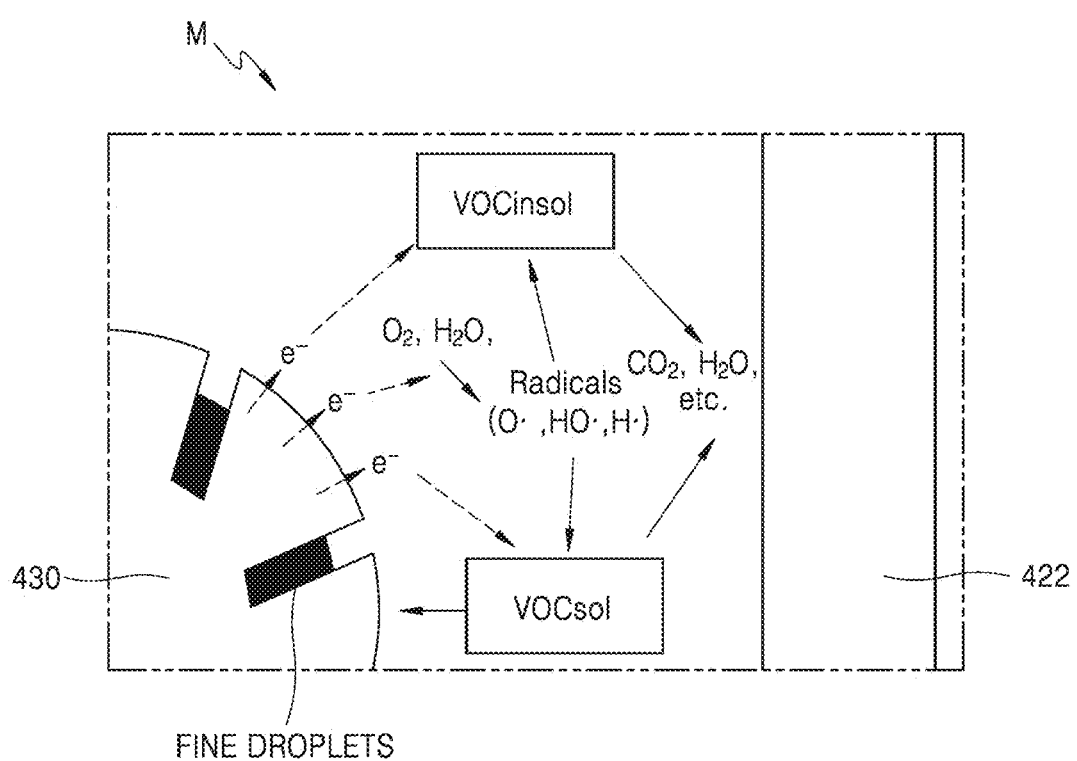
FIGS. 3C and 3D are enlarged schematic views of a region M shown in FIG. 3A.
Figure 3D:
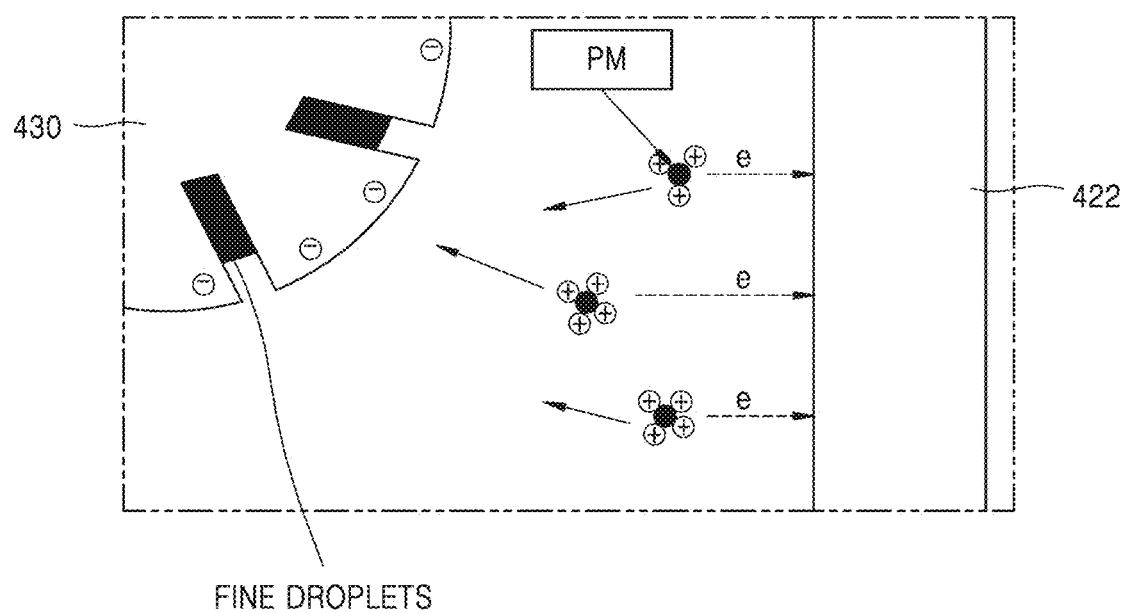

FIG. 3A is an enlarged cross-sectional view illustrating a part of the plasma reaction unit 40 illustrated in FIG. 2. FIG. 3B is a schematic diagram of an embodiment of a dielectric particle. FIGS. 3C and 3D are enlarged schematic views of a region M shown in FIG. 3A.

Referring to FIGS. 2 and 3A to 3D, the plasma reaction unit 40 in an embodiment may include a reactor 410 having a hollow shape extending in one direction, a discharge plasma generator 420 which generates discharge plasma in the reactor 410, and a plurality of dielectric particles 430 disposed in a packed-bed of the reactor 410.

The reactor 410 forms a flow path of the first purified air $Air_3$. In an embodiment, the first purified air $Air_3$ may include fine droplets capable of minimizing the water film formed on the surfaces of the dielectric particles 430. In an embodiment, a ratio of a volume flow rate of the fine droplets to the first purified air $Air_3$ may be about 0.0001 or more and about 0.001 or less, for example. In an embodiment, when the volume flow rate of the first purified air $Air_3$ is 1 liter per second (L/sec), the volume flow rate of the fine droplets may be about 0.1 milliliter per second (mL/sec) or more and about 1 mL/sec. In addition, a packed-bed 411, in which a plurality of dielectric particles 430 is disposed, is provided inside the reactor 410. In an embodiment, the packed-bed 411 may be a discharge region in which discharge plasma is generated by the plasma reaction unit 40. However, the invention is not limited thereto, and another region including the packed-bed 411 may be a discharging region.

The reactor 410 in an embodiment may have a hollow shape extending in one direction and through which the first purified air $Air_3$ may flow. In an embodiment, the reactor 410 may be provided as a glass conduit or an aluminum conduit extending in one direction. However, the invention is not limited thereto, and any hollow conduit capable of generating discharge plasma may be used as the reactor 410.

The discharge plasma generator 420 may include a first electrode 421 disposed on an outer wall of the reactor 410, a second electrode 422 disposed inside the reactor 410, and a high voltage generator 423. The first electrode 421 in an embodiment may be a ground electrode, and a discharge region in which discharge plasma may be generated may be surrounded by the first electrode 421. In an embodiment, the first electrode 421 may be integrated with the reactor 410 when the reactor 410 is a conductor, and when the reactor 410 is a non-conductor, the first electrode 421 may be provided as a silver paste film or a stainless steel tube and surround an outer wall of the reactor 410, for example.

In addition, the second electrode 422, as a power electrode, may be separated from the first electrode 421 with a predetermined interval therebetween in a discharge region where discharge plasma may be generated. In an embodiment, the second electrode 422 may be provided as a steel wire extending in one direction and disposed inside the reactor 410, for example.

In addition, the high voltage generator 423 may apply a high voltage to the discharge region where discharge plasma may be generated. The high voltage generator 423 in an embodiment may include a sinusoidal alternating current ("AC") power supplier and a transformer. The high voltage generator 423 may continuously apply a high voltage to the inside of the reactor 410, e.g., to the discharge region where discharge plasma may be generated through the electrical system described above. In an embodiment, a voltage applied to the discharge region may be about 2 kilovolts (kV) or more and about 500 KV or less, and a frequency may be about 10 hertz (Hz) or more and about 1000 Hz or less, but the invention is not limited thereto. In addition, a separation distance between the first electrode 421 and the second electrode 422 in the discharge region may be about 10 millimeters (mm) or more and about 100 mm or less, and accordingly, an electric field of about 2 kilovolts per centimeter (kV/cm) or more and about 50 kV/cm or less may be applied to the discharge region.

The plurality of dielectric particles 430 may be disposed in the packed-bed 411 inside the reactor 410. The plurality of dielectric particles 430 in an embodiment may be polarized to attract ionized contaminants. In an embodiment, the plurality of dielectric particles 430 may include a dielectric material capable of being polarized in a discharge region generated by the discharge plasma generator 420, for example. In an embodiment, the plurality of dielectric particles 430 may include a metal oxide or a metal nitride, e.g., at least one of silicon oxide, boron oxide, aluminum oxide, manganese oxide, titanium oxide, barium oxide, copper oxide, magnesium oxide, zinc oxide, zirconium oxide, yttrium oxide, calcium oxide, nickel oxide, and iron oxide.

Also, in an embodiment, the plurality of dielectric particles 430 may form predetermined pores to control a staying time of the first purified air $Air_3$ in the reactor 410. In an embodiment, the plurality of dielectric particles 430 may have a bead shape having a predetermined particle diameter, e.g., an average particle diameter of about 0.5 mm or more and about 20 mm or less. However, the invention is not limited thereto, and the plurality of dielectric particles 430 may have other three-dimensional shapes, such as an arbitrary cuboid.

In an embodiment, the water-soluble organic compound $VOC_{sol}$ may be directly decomposed by the discharge plasma generator 420. In an embodiment, when a high voltage is applied to the packed-bed 411 by the discharge plasma generator 420, the water-soluble organic compound $VOC_{sol}$ may be decomposed by OH radicals (OH·). In an embodiment, when a high voltage is applied to the packed-bed 411 by the discharge plasma generator 420, oxygen ($O_2$) in the air surrounding the second electrode 422 disposed inside the reactor 410 and water molecules ($H_2O$) are broken into neutral gas ions (a plasma state), and OH radicals (OH) may be generated from these ions. In an embodiment, among the water-soluble organic compounds $VOC_{sol}$, acetic acid ($CH_3COOH$), acetaldehyde ($CH_3CHO$), and methane ($CH_4$) may be decomposed into carbon dioxide ($CO_2$) and water ($H_2O$) as shown in Reactions 1 to 3 below. At this time, carbon dioxide ($CO_2$) and water ($H_2O$), which are decomposed products, may be discharged to the outside of the reactor 410.

$$CH_3COOH+4OH+O_2 \rightarrow 2CO_2+4H_2O \quad \text{[Reaction 1]}$$

$$CH_3CHO+6OH+O_2 \rightarrow 2CO_2+5H_2O \quad \text{[Reaction 2]}$$

$$CH_4+4OH+O_2 \rightarrow CO_2+4H_2O \quad \text{[Reaction 3]}$$

In addition, in an embodiment, the water-insoluble organic compound $VOC_{insol}$ may be directly decomposed by the discharge plasma generator 420. In an embodiment, when a high voltage is applied to the packed-bed 411 by the discharge plasma generator 420, the water-insoluble organic compound $VOC_{insol}$ may be decomposed by OH radicals (OH·). In an embodiment, when a high voltage is applied to the packed-bed 411 by the discharge plasma generator 420, oxygen ($O_2$) in the air surrounding the second electrode 422 disposed inside the reactor 410 and water molecules ($H_2O$) are broken into neutral gas ions (a plasma state), and OH radicals (OH·) may be generated from these ions. In an embodiment, water-soluble organic toluene ($C_6H_5CH_3$) may be decomposed into carbon dioxide ($CO_2$) and water ($H_2O$) by OH radicals (OH·). At this time, carbon dioxide ($CO_2$) and water ($H_2O$), which are decomposed products, may be discharged to the outside of the reactor 410.

In addition, in an embodiment, when a high voltage is applied to the packed-bed 411 by the discharge plasma generator 420, electrons e may be generated from the second electrode 422 itself disposed inside the reactor 410, or electrons (e) may be generated in a gas around the second electrode 422, and thus, discharge plasma may be generated around the second electrode 422. The electrons e generated around the second electrode 422 move to the second electrode 422 to which the opposite charge is applied by electrical attraction. The ions from which electrons are separated charge the surrounding fine dust PM, and the fine dust PM has a positive (+) charge. Also, when a high voltage is applied to the packed-bed 411 by the discharge plasma generator 420, an electric field is applied between the first electrode 421 and the second electrode 422. In this case, the plurality of dielectric particles 430 disposed in the electric field may be polarized. In an embodiment, as shown in FIG. 3D, the plurality of dielectric particles 430 facing the second electrode 422 has a negative (−) charge. As described above, the fine dust PM having a positive (+) charge by the plasma may be collected by moving toward the plurality of dielectric particles 430 having an opposite charge by electrical attraction.

As described above, the plurality of dielectric particles 430 may be polarized in the discharge region. However, when a water film is formed on surfaces of the plurality of dielectric particles 430, a surface charge of the plurality of dielectric particles 430 may be reduced or eliminated. In order to maintain the surface charge of the plurality of dielectric particles 430, the formation of a water film on the surfaces of the plurality of dielectric particles 430 should be minimized.

In an embodiment, the plurality of dielectric particles 430 may include a porous structure including one or more micro-channels 431. In an embodiment, when the plurality of dielectric particles 430 is provided in a bead shape having a predetermined particle diameter, e.g., an average particle diameter of about 0.5 mm or more and about 20 mm or less, one or more micro-channels 431 may be disposed on the surfaces of the plurality of dielectric particles 430, for example. In this case, the plurality of dielectric particles 430 may have a relative density of about 30% or more and about 90% or less. When the plurality of dielectric particles 430 include one or more micro-channels 431, the fine droplets included in the first purified air $Air_3$ may be absorbed into one or more micro-channels 431 by capillary action. Accordingly, the formation of a water film on the surfaces of the plurality of dielectric particles 430 may be minimized. In addition, as the water film formed on the surfaces of the plurality of dielectric particles 430 is minimized, the surface charge formed on the surfaces of the plurality of dielectric particles 430 may be maintained relatively constant.

Figure 5:
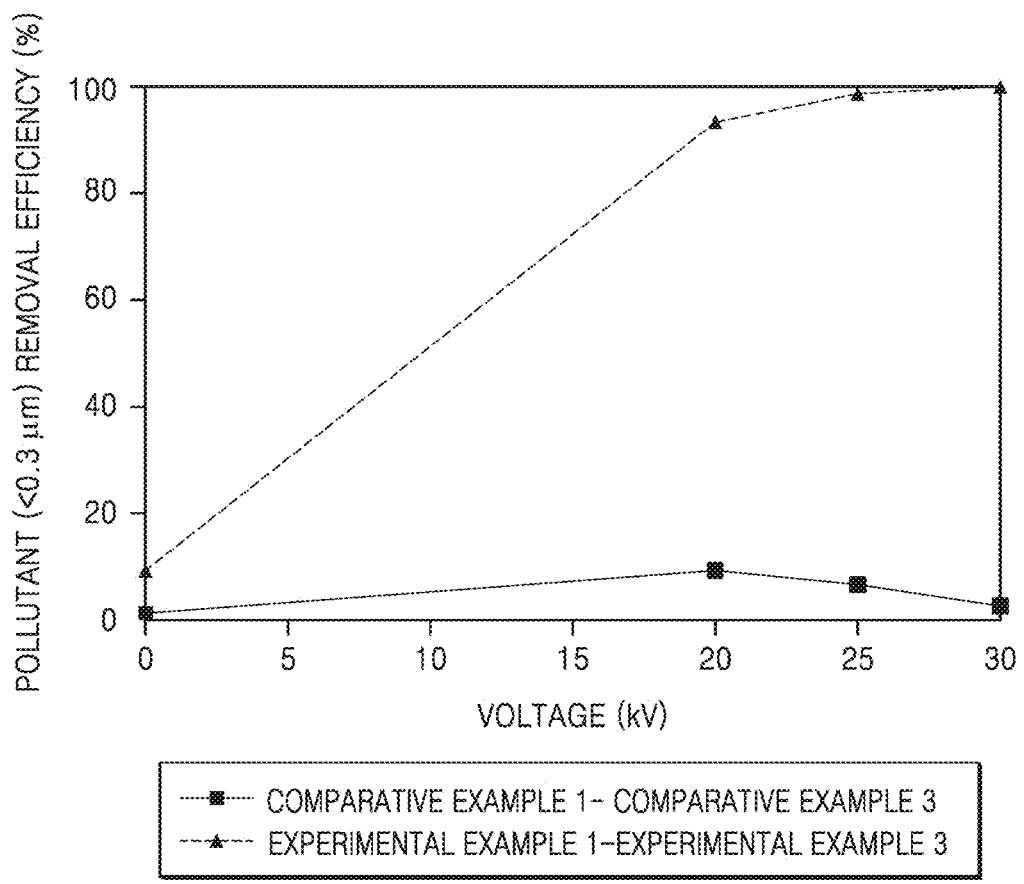
FIG. 5 is a graph showing changes in a removal efficiency of potassium chloride according to Experimental Examples 1 to 3 and Comparative Examples 1 to 3.

FIG. 4 is a graph showing changes in concentration of potassium chloride in Experimental Example 1 and Comparative Example 1 before a discharge plasma treatment. FIG. 5 is a graph showing changes in a removal efficiency of potassium chloride according to Experimental Examples 1 to 3 and Comparative Examples 1 to 3.

Experimental Examples 1 to 3

At atmospheric pressure and a temperature close to room temperature, a reaction of a contaminant and the first purified air $Air_3$ including fine droplets was performed by the air purifier 1.

In Experimental Example 1, the contaminant is potassium chloride (KCl) having a concentration of about 1,000,000 pieces per cubic centimeters (/cm$^3$), and the volume flow rate of the first purified air $Air_3$ including potassium chloride (KCl) is about 10 liter per minute (L/min). At this time, the fine droplets were water, and the volume flow rate of the fine droplets was about 4 mL/min. As a dielectric barrier of the reactor 410, a glass tube having an inner diameter of about 20 mm and a thickness of about 2 mm was used. A stainless steel rod having a diameter of about 10 mm was used as the second electrode 422 (a power electrode), and a stainless steel tube having an outer diameter of about 51 mm and an inner diameter of about 48 mm was used as the first electrode 421 (a ground electrode). A discharge region of about 250 mm in length in the reactor 410 was surrounded by the ground electrode. A discharge gap between an inner surface of the stainless steel tube as the first electrode and the high voltage electrode as the second electrode 422 is about 19 mm. At this time, a volume of the plasma discharge region is fixed to about 432.75 cm$^3$. A plurality of dielectric particles 430 is completely filled in the packed-bed 411 provided in the plasma discharge region. In this case, the plurality of dielectric particles 430 is porous alumina particles having a spherical shape with a diameter of about 10 mm and a relative density of about 99%, and a porosity of the packed-bed 411 is about 53%. A voltage applied to the plasma discharge region was about 30 KV, the frequency was about 100 Hz, and a pulse-rise time was about 50 nanoseconds (ns).

In Experimental Example 2, a voltage applied to the plasma discharge region was about 25 kV, and a frequency was about 100 Hz. The rest of the configuration is the same as those in Experimental Example 1.

In Experimental Example 3, a voltage applied to the plasma discharge region was about 20 kV, and a frequency was about 100 Hz. The rest of the configuration is the same as those in Experimental Example 1.

Comparative Examples 1 to 3

In Comparative Example 1, in the packed-bed 411 provided in the plasma discharge region, the plurality of dielectric particles 430 is high-density alumina particles having a spherical shape with a diameter of about 10 mm and a relative density of about 99%. The rest of the configuration is the same as those in Experimental Example 1.

In Comparative Example 2, a voltage applied to the plasma discharge region was about 25 kV, and a frequency was about 100 Hz. The rest of the configuration is the same as those in Comparative Example 1.

In Comparative Example 3, a voltage applied to the plasma discharge region was about 20 kV, and a frequency was about 100 Hz. The rest of the configuration is the same as those in Comparative Example 1.

Referring to Experimental Example 1 and Comparative Example 1, it may be seen that a removal rate of potassium chloride (KCl) in the Experimental Example 1 was about 99.47%, while the removal rate of potassium chloride (KCl) in the Comparative Example 1 was about 2.63%. That is, in Experimental Example 1, in which the formation of a water film on the plurality of dielectric particles 430 is prevented, the surface charge of the plurality of dielectric particles 430 may be maintained, and accordingly, it may be seen that the deterioration of the removal efficiency of potassium chloride (KCl) is prevented.

In addition, referring to Experimental Examples 1 to 3, it may be seen that the removal rate of potassium chloride (KCl) increases as the voltage applied to the plasma discharge region increases. That is, in Experimental Examples 1 to 3, in which the formation of a water film on the plurality of dielectric particles 430 is prevented, the surface charge of the plurality of dielectric particles 430 increases as the voltage applied to the plasma discharge region increases, and accordingly, it may be seen that the removal rate of potassium chloride (KCl) is increased. In Comparative Examples 1 to 3, in which a water film is formed on the plurality of dielectric particles 430, even when the voltage applied to the plasma discharge region increases, the surface charge of the plurality of dielectric particles 430 may decrease. Therefore, it may be seen that the removal rate of potassium chloride (KCl) is reduced.

Referring back to FIGS. 2 and 3B, the fine droplets included in the first purified air $Air_3$ are collected in one or more micro-channels 431 provided in the plurality of dielectric particles 430. The fine droplets collected in one or more micro-channels 431 are converted into a liquid $L_2$ by combining with each other. The liquid $L_2$ falls in the direction of gravity G. The liquid $L_2$ that has fallen in the direction of gravity G may be recovered by the liquid recovery unit 80.

In an embodiment, ozone ($O_3$) may be generated from oxygen ($O_2$) in the air by the plasma reaction unit 40. When ozone ($O_3$) is generated inside the reactor 410, the ozone ($O_3$) may be combined with fine droplets to be described later and used as ozone water. However, when the concentration of ozone ($O_3$) generated by the plasma reaction unit 40 exceeds a range that may be used as ozone water, excess ozone ($O_3$) may be included in the second purified air $Air_4$ from which contaminants have been removed by passing through the plasma reaction unit 40

In an embodiment, when ozone ($O_3$) is generated inside the plasma reaction unit 40 and the concentration of ozone ($O_3$) in the plasma reaction unit 40 increases, in order to prevent the increase in the concentration of ozone ($O_3$), the fine droplets supplied from the liquid supply unit 21 may be provided as a basic aqueous solution. In an embodiment, the basic aqueous solution may be a sodium hydroxide (NaOH) aqueous solution having a molar concentration of 2 millimoles per liter (mmol/L) or more and 20 mmol/L or less. The alkaline strength (PH) of the basic aqueous solution may also be determined according to the concentration of the ozone ($O_3$) inside the plasma reaction unit 40. In an embodiment, when the concentration of ozone ($O_3$) inside the plasma reaction unit 40 increases, the alkaline strength (PH) of the basic aqueous solution may also increase in proportion to the increase in the ozone concentration, for example. However, when the fine droplets supplied from the liquid supply unit 21 are water or excess ozone ($O_3$) is included in the second purified air $Air_4$, the ozone ($O_3$) may be removed through the catalyst unit 50, as described below.

The catalyst unit 50 may be disposed at a rear end of the plasma reaction unit 40, e.g., a rear end of the reactor 410 included in the plasma reaction unit 40, and may remove ozone discharged from the plasma reaction unit 40 by a catalyst. In an embodiment, the catalyst included in the catalyst unit 50 may include at least one of a metal oxide and a metal nitride, e.g., one or more of manganese oxide, copper oxide, aluminum oxide, titanium oxide, for example. The third purified air $Air_5$ from which ozone ($O_3$) is removed from the catalyst unit 50 may be finally discharged as purified air to the outside of the air purifier 1.

FIG. 6 is a flowchart of an embodiment of a method of purifying air.

Referring to FIGS. 1, 2, 3A to 3C and 6, in an embodiment, fine dust and water-soluble pollutants are removed by contact between fine droplets and polluted air $Air_1$ at a front end of the reactor 410 (S110). In an embodiment, the polluted air $Air_1$ may be a mixed gas including at least one of fine dust PM, a water-soluble organic compound $VOC_{sol}$, and a water-insoluble organic compound $VOC_{insol}$. The volume flow rate by which the polluted air $Air_1$ is introduced may be increased or decreased according to the purification capability of the air purifier 1. In this case, the fine droplets may include water or a basic aqueous solution. The fine dust and water-soluble pollutants included in the polluted air $Air_1$ may contact the fine droplets, and may be collected and removed by the impactor 31 having a plurality of microchannels.

In an embodiment, the first purified air $Air_3$ including fine droplets and polluted air may be introduced into the reactor 410 (S120). At this time, the first purified air $Air_3$ may include fine droplets and polluted air that are not collected by the impactor 31.

Next, discharge plasma may be generated by applying a predetermined voltage to the first electrode 421 and the second electrode 422 (S130). In an embodiment, the first electrode 421 as a ground electrode may be disposed on the outer wall of the reactor 410, and the second electrode 422 as a power electrode may be disposed inside the reactor 410. In this case, the first electrode 421 and the second electrode 422 may be separated from each other with a predetermined interval therebetween. As a result of applying a predetermined voltage to the first electrode 421 and the second electrode 422, discharge plasma is generated in the packed-bed 411. In this case, the packed-bed 411 may be filled with a plurality of dielectric particles 430.

In an embodiment, the plurality of dielectric particles 430 may include at least one of silicon oxide, boron oxide, aluminum oxide, manganese oxide, titanium oxide, barium oxide, copper oxide, magnesium oxide, zinc oxide, zirconium oxide, yttrium oxide, calcium oxide, nickel oxide, and iron oxide. Also, the plurality of dielectric particles 430 may have a porous structure including one or more microchannels 431. In an embodiment, the plurality of dielectric particles 430 may have a relative density of about 30% or more and about 90% or less, for example. Accordingly, a water film that may be generated on the surfaces of the plurality of dielectric particles 430 may be prevented.

Next, a liquid and purified air may be discharged from the reactor 410 (S140). In an embodiment, the second purified air $Air_4$ and the liquid $L_2$ from which contaminants included in the first purified air $Air_3$ are removed may be discharged to the outside of the reactor 410.

Next, ozone may be removed by a catalyst at the rear end of the reactor 410 (S150). In an embodiment, the catalyst included in the catalyst unit 50 may include at least one of manganese oxide, copper oxide, and aluminum oxide, or a combination of these materials. The third purified air $Air_5$ that is finally purified through the catalyst unit 50 may be discharged to the outside of the air purifier 1.

By the embodiments described above, in the air purifier and the method of purifying air, the surface charge of the dielectric particles filled in the discharge plasma reactor may be constantly maintained. Accordingly, because contaminants are more easily decomposed and discharged to the outside by the plasma, a high contaminant removal performance may be realized.

In addition, because the liquid in which the fine dust and contaminants are collected is easily discharged from the air purifier, the burden of periodic management or replacement of a pollutant purification unit, such as a filter and an adsorbent, may be reduced.

Embodiments of the air purifier and the method of purifying air have been described with reference to the accompanying drawings to facilitate understanding, but this is merely one of embodiments, and it will be understood by those skilled in the art that various changes in form and details may be made therein without departing from the spirit and scope of the invention. Accordingly, the true scope of the invention should be defined not by the detailed descriptions but by the appended claims.

It should be understood that embodiments described herein should be considered in a descriptive sense only and not for purposes of limitation. Descriptions of features or advantages within each embodiment should typically be considered as available for other similar features or advantages in other embodiments. While embodiments have been described with reference to the drawing figures, it will be understood by those of ordinary skill in the art that various changes in form and details may be made therein without departing from the spirit and scope as defined by the following claims.

What is claimed is:

1. An air purifier comprising:
   a reactor having a hollow shape extending in a predetermined direction;
   a discharge plasma generator which includes a first electrode disposed on an outer wall of the reactor and a second electrode disposed inside the reactor, and generates discharge plasma in a predetermined discharge region;
   a plurality of dielectric particles disposed in a packed-bed of the reactor;
   a gas-liquid contact unit disposed at a front end of the reactor; and
   a fluid mixer disposed at a front end of the gas-liquid contact unit;
   wherein the fluid mixer comprises a liquid supply unit which supplies fine droplets to a polluted air,
   wherein the fluid mixer is configured to mix the fine droplets with the polluted air to a gas-liquid mixed fluid air,
   wherein the gas-liquid contact unit is configured to separates the gas-liquid mixed fluid air into a first purified air and a liquid,
   wherein at least one micro-channel is defined in at least one dielectric particle of the plurality of dielectric particles and
   the plurality of dielectric particles has a relative density of about 30 percent or more and about 90 percent or less compared to a reference density of the plurality of dielectric particles in the packed-bed in which the at least one micro-channel is not defined.

2. The air purifier of claim 1, wherein the plurality of dielectric particles includes at least one of silicon oxide, boron oxide, aluminum oxide, manganese oxide, titanium oxide, barium oxide, copper oxide, magnesium oxide, zinc oxide, zirconium oxide, yttrium oxide, calcium oxide, nickel oxide, and iron oxide.

3. The air purifier of claim 1, wherein a porosity of the packed-bed is greater than about 10 percent and less than or equal to about 90 percent,
   and the porosity is a ratio of a volume of a void space in the packed-bed to a total volume of the packed-bed.

4. The air purifier of claim 3, wherein the plurality of dielectric particles has an average particle diameter of about 0.5 millimeter or more and about 20 millimeters or less.

5. The air purifier of claim 1, wherein a ratio of the fine droplets with respect to the first purified air supplied to the reactor is about 0.0001 or more and about 0.001 or less.

6. The air purifier of claim 1, wherein a voltage of about 2 kilovolts or more and about 500 kilovolts or less is applied to the predetermined discharge region.

7. The air purifier of claim 6, further comprising a voltage generator which applies the voltage to the inside of the reactor.

8. The air purifier of claim 1, wherein the first electrode is provided with a silver paste film.

9. The air purifier of claim 1, wherein the second electrode extends in the predetermined direction and is separated from the first electrode with a predetermined distance therebetween.

10. The air purifier of claim 1, wherein the reactor is provided with a glass conduit extending in the predetermined direction.

11. The air purifier of claim 1, wherein the fine droplets include water.

12. The air purifier of claim 1, wherein the fine droplets include a basic aqueous solution.

13. The air purifier of claim 12, wherein an alkaline strength (PH) of the basic aqueous solution is determined according to an ozone concentration inside the reactor.

14. The air purifier of claim 12, wherein the fine droplets are an aqueous sodium hydroxide solution having a molar concentration of about 2 millimoles per liter or more and about 20 millimoles per liter or less.

15. The air purifier of claim 1, further comprising a catalyst unit disposed at a rear end of the reactor to remove ozone discharged from the reactor by a catalyst.

* * * * *